United States Patent
Song et al.

(10) Patent No.: US 11,281,724 B2
(45) Date of Patent: Mar. 22, 2022

(54) METHOD AND SYSTEM FOR PROVIDING RECOMMENDATION QUERY USING SEARCH CONTEXT

(71) Applicant: NAVER CORPORATION, Seongnam-si (KR)

(72) Inventors: Hyun-Je Song, Seongnam-si (KR); Hee-Cheol Seo, Seongnam-si (KR); SeungJun Lee, Seongnam-si (KR); Yongsoo Seol, Seongnam-si (KR); Injae Lee, Seongnam-si (KR); Seongeun So, Seongnam-si (KR); Jihye Lee, Seongnam-si (KR); Eunyoung Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 227 days.

(21) Appl. No.: 16/389,357

(22) Filed: Apr. 19, 2019

(65) Prior Publication Data

US 2019/0251125 A1    Aug. 15, 2019

Related U.S. Application Data

(63) Continuation of application No. PCT/KR2017/008282, filed on Aug. 1, 2017.

(30) Foreign Application Priority Data

Oct. 21, 2016    (KR) .................. 10-2016-0137816

(51) Int. Cl.
*G06F 7/02*    (2006.01)
*G06F 16/00*    (2019.01)
(Continued)

(52) U.S. Cl.
CPC ........ *G06F 16/90324* (2019.01); *G06F 16/00* (2019.01); *G06F 16/906* (2019.01)

(58) Field of Classification Search
CPC .. G06F 16/90324; G06F 16/906; G06F 16/00; G06F 16/242; G06F 16/332; G06F 16/335
See application file for complete search history.

(56) References Cited

U.S. PATENT DOCUMENTS

| 8,489,625 B2 * | 7/2013 | Ni ..................... G06F 16/9535 707/758 |
| 2005/0055341 A1 * | 3/2005 | Haahr ................ G06F 16/3326 |

(Continued)

FOREIGN PATENT DOCUMENTS

| JP | 2002092032 A | 3/2002 |
| JP | 2012133520 A | 7/2012 |

(Continued)

OTHER PUBLICATIONS

Japanese Office Action dated Mar. 17, 2020 by the Japanese Patent Office corresponding to Japanese patent application No. 2019-512773.

(Continued)

*Primary Examiner* — Bruce M Moser
(74) *Attorney, Agent, or Firm* — Greer Burns & Crain Ltd.

(57) ABSTRACT

Provided is a query recommendation method and system using a search context. A recommendation query providing method may include generating candidate queries to be recommended to a user based on a search context including a query history associated with the user and a search result provided for each query; performing clustering of the candidate query based on a similarity between candidate queries; and providing an electronic device of the user with a (Continued)

final candidate query selected from each cluster of candidate queries as a recommendation query.

18 Claims, 10 Drawing Sheets

(51) Int. Cl.
    *G06F 16/9032*    (2019.01)
    *G06F 16/906*    (2019.01)

(56) References Cited

U.S. PATENT DOCUMENTS

| | | | | |
|---|---|---|---|---|
| 2006/0230035 | A1* | 10/2006 | Bailey | G06F 16/3322 |
| 2007/0282811 | A1* | 12/2007 | Musgrove | G06F 16/2423 |
| 2008/0256061 | A1 | 10/2008 | Chang et al. | |
| 2010/0082604 | A1* | 4/2010 | Gutt | G06F 16/3326 |
| | | | | 707/721 |
| 2010/0306229 | A1* | 12/2010 | Timm | G06F 16/951 |
| | | | | 707/767 |
| 2012/0124071 | A1* | 5/2012 | Gebhard | G06F 16/90324 |
| | | | | 707/767 |
| 2015/0325237 | A1* | 11/2015 | Chang | G06F 16/24575 |
| | | | | 704/257 |
| 2015/0379134 | A1* | 12/2015 | Bax | G06F 16/90328 |
| | | | | 707/722 |
| 2016/0078101 | A1* | 3/2016 | Somaiya | G06F 16/3322 |
| | | | | 707/706 |
| 2016/0210301 | A1 | 7/2016 | Jiang et al. | |

FOREIGN PATENT DOCUMENTS

| | | |
|---|---|---|
| KR | 100860093 B1 | 9/2008 |
| KR | 20120023266 A | 3/2012 |
| KR | 20130026040 A | 3/2013 |
| KR | 20140128381 A | 11/2014 |
| KR | 20150105100 A | 9/2015 |

OTHER PUBLICATIONS

ISR issued in Int'l. App. No. PCT/KR2017/008282 dated Oct. 30, 20187.

* cited by examiner

FIG. 6

```
┌ ─ ─ ─ ─  Search context  ─ ─ ─ ─ ┐
│ Search query: jinyi hwang        │
│ Search result: drama jinyi hwang │
└ ─ ─ ─ ─ ─ ─ ─ ─ ─ ─ ─ ─ ─ ─ ─ ─ ┘
```

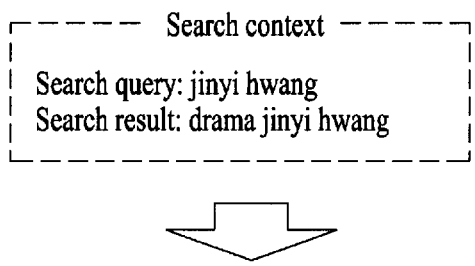

| Query recommendation module | Candidate query |
| --- | --- |
| Ambiguous candidate query (601) | Movie jinyi hwang, famous hostess of Chosen dynasty, jinyi hwang, music jinyi hwang, book jinyi hwang, etc. |
| Attribute type candidate query (602) | Cast, production staff, story, episode information, etc. |
| Related candidate query (603) | Jinyi hwang OST, jinyi hwang poem, jinyi hwang movie, jinyi hwang lyrics, jinyi hwang viewer ratings, etc. |
| Hot topic candidate query (604) | Jiwon ha's recent condition, jiwon ha marriage, etc. |

METHOD AND SYSTEM FOR PROVIDING RECOMMENDATION QUERY USING SEARCH CONTEXT

CROSS-REFERENCE TO RELATED APPLICATIONS

This is a continuation application of International Application No. PCT/KR2017/008282, filed Aug. 1, 2017, which claims benefit of Korean Patent Application No. 10-2016-0137816 filed Oct. 21, 2016.

BACKGROUND OF THE INVENTION

Field of Invention

Example embodiments relate to technology for providing a recommendation query in a search service.

Description of Related Art

A search service refers to a service that provides a user with a search result corresponding to a query, for example, a website including an input query, an article including the input query, and an image with a file name including the input query, in response to the query input from the user.

Currently, as a mobile terminal, such as a smartphone, a tablet, and a wearable device, is widely used, the search service is provided even using the mobile terminal.

The mobile terminal has been evolved to include a variety of functions available in a personal computer (PC), such as communication, a game, and a multimedia service, as well as the search service.

As an example of technology for providing an Internet search service in a mobile environment, technology for providing a search service using a mobile web is disclosed in Korean Patent Registration No. 10-0860093, registered on Sep. 18, 2008.

BRIEF SUMMARY OF THE INVENTION

One or more example embodiments provide a method and system that provides a recommendation query by applying a search context in an interactive search service that exchanges a search query and a search result with a user in a conversational mode.

One or more example embodiments also provide a method and system that provides a query subsequently searchable by a user based on a query history input from the user using an interactive search service and a search result for each query.

According to an aspect of at least one example embodiment, there is provided a recommendation query providing method of a server implemented as a computer, the recommendation query providing method including generating candidate queries to be recommended to a user based on a search context including a query history associated with the user and a search result provided for each search query input from the user; performing clustering of the candidate queries based on a similarity between the candidate queries; and providing an electronic device of the user with a final candidate query selected from each cluster of candidate queries as a recommendation query.

According to an aspect, the generating may include analyzing an ambiguity of a search query input from the user using the query history and the search result for each query, and generating the candidate query based on the ambiguity of the search query.

According to another aspect, the generating may include generating an ambiguous candidate query for recommending other targets different from a target retrieved as a search result based on an ambiguity of a search query input from the user.

According to another aspect, the generating may further include generating at least one of an attribute type candidate query for recommending attributes corresponding to the target retrieved as the search result, a related candidate query for recommending a related keyword associated with the search query, and a hot topic candidate query for recommending a hot topic target associated with the target retrieved as the search result.

According to another aspect, the generating may include generating the candidate queries using at least two recommendation logics among an ambiguous query recommendation logic for recommending other targets different from a target retrieved as a search result based on an ambiguity of a search query input from the user, an attribute type query recommendation logic for recommending attributes corresponding to the target retrieved as the search result, a related query recommendation logic for recommending a related keyword associated with the search query, and a hot topic query recommendation logic for recommending a hot topic target associated with the target retrieved as the search result.

According to another aspect, the recommendation query providing method may further include removing, from among the candidate queries, a portion of candidate queries that overlap queries included in the query history.

According to another aspect, the removing may include removing at least a portion of the candidate queries using at least one of a query history recommended to the user and a query history directly input from the user.

According to another aspect, the removing may include removing, from among the candidate queries, a query previously used by the user for a search using the query history.

According to another aspect, the removing may include selecting a query having a history used for a search at a desired ratio or less compared to a number of recommendations from among queries recommended to the user using the query history, and removing a candidate query that overlaps the selected query.

According to another aspect, the performing may include performing clustering using a K-mean algorithm that performs a division by K clusters based on the similarity between the candidate queries.

According to another aspect, the performing may include determining a level of ambiguity of a target retrieved in response to the search query input from the user and a number of the candidate queries, and performing clustering based on the similarity between the candidate queries and a desired number of clusters.

According to an aspect of at least one example embodiment, there is provided a recommendation query providing system of a server implemented as a computer, the recommendation query providing system including at least one processor configured to execute computer-readable instructions. The at least one processor includes a candidate query generator configured to generate candidate queries to be recommended to a user based on a search context including a query history associated with the user and a search result provided for each query; a query clustering performer configured to perform clustering of candidate queries based on a similarity between the candidate queries; and a recommendation query provider configured to provide an electronic device of the user with a final candidate query selected from each cluster of candidate queries as a recommendation query.

According to some example embodiments, it is possible to provide a recommendation query based on a result of verifying a search context including a query history of a user in response to a search query input from the user.

According to some example embodiments, it is possible to verify a query history input from a user using an interactive search service and to provide a recommendation query to which a query intent of the user is applied.

According to some example embodiments, it is possible to verify an ambiguity of a current input search query based on a query history input from the user and a search result for each query, and to recommend a query having a meaning different from a corresponding query.

BRIEF DESCRIPTION OF THE DRAWINGS

FIGS. 5 and 6 illustrate examples of a process of generating a candidate query through a plurality of recommendation logics according to at least one example embodiment.

DETAILED DESCRIPTION OF THE INVENTION

Hereinafter, example embodiments will be described with reference to the accompanying drawings.

Example embodiments relate to technology for providing a recommendation query in a search service, and more particularly, to technology that may provide a recommendation query by applying a search context including a query history of a user at an interactive search service that receives a search query from the user in a conversational mode and provides a search result corresponding to the search query as a response to the search query.

The example embodiments disclosed herein may provide a recommendation query based on a search context in an interactive search environment and may achieve considerable advantages in terms of efficiency, convenience, and cost saving.

Figure 1:
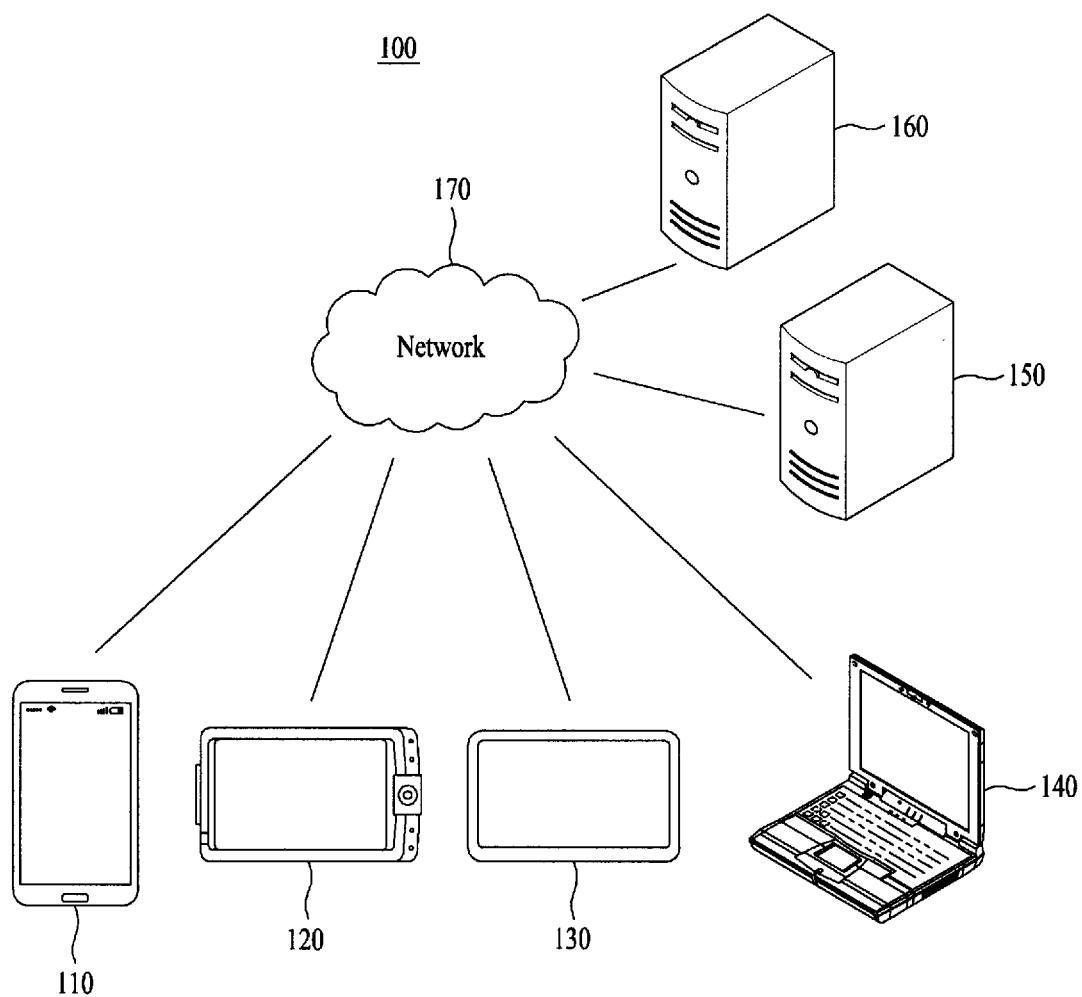
FIG. 1 is a diagram illustrating an example of a network environment according to one example embodiment.

FIG. 1 is a diagram illustrating an example of a network environment 100 according to one example embodiment. Referring to FIG. 1, the network environment 100 includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), and a tablet personal computer (PC). For example, the electronic device (1) 110 may communicate with other electronic devices 120, 130, and, and/or the servers 150 and 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 160 may provide a file for installing an application to the electronic device (1) 110 connected over the network 170. In this case, the electronic device (1) 110 may install the application using the file provided from the server 160. Also, the server 160 may receive a service or content provided from the server 150 through connection to the server 150 under control of at least one program, for example, browser or the installed application, or an operating system (OS) included in the electronic device (1) 110. For example, once the electronic device (1) 110 transmits a service request message to the server 150 over the network 170 under control of the application, the server 150 may transmit a code corresponding to the service request message to the electronic device (1) 110 and the electronic device (1) 110 may configure and display a screen according to a code under control of the application and may provide content to the user.

Figure 2:
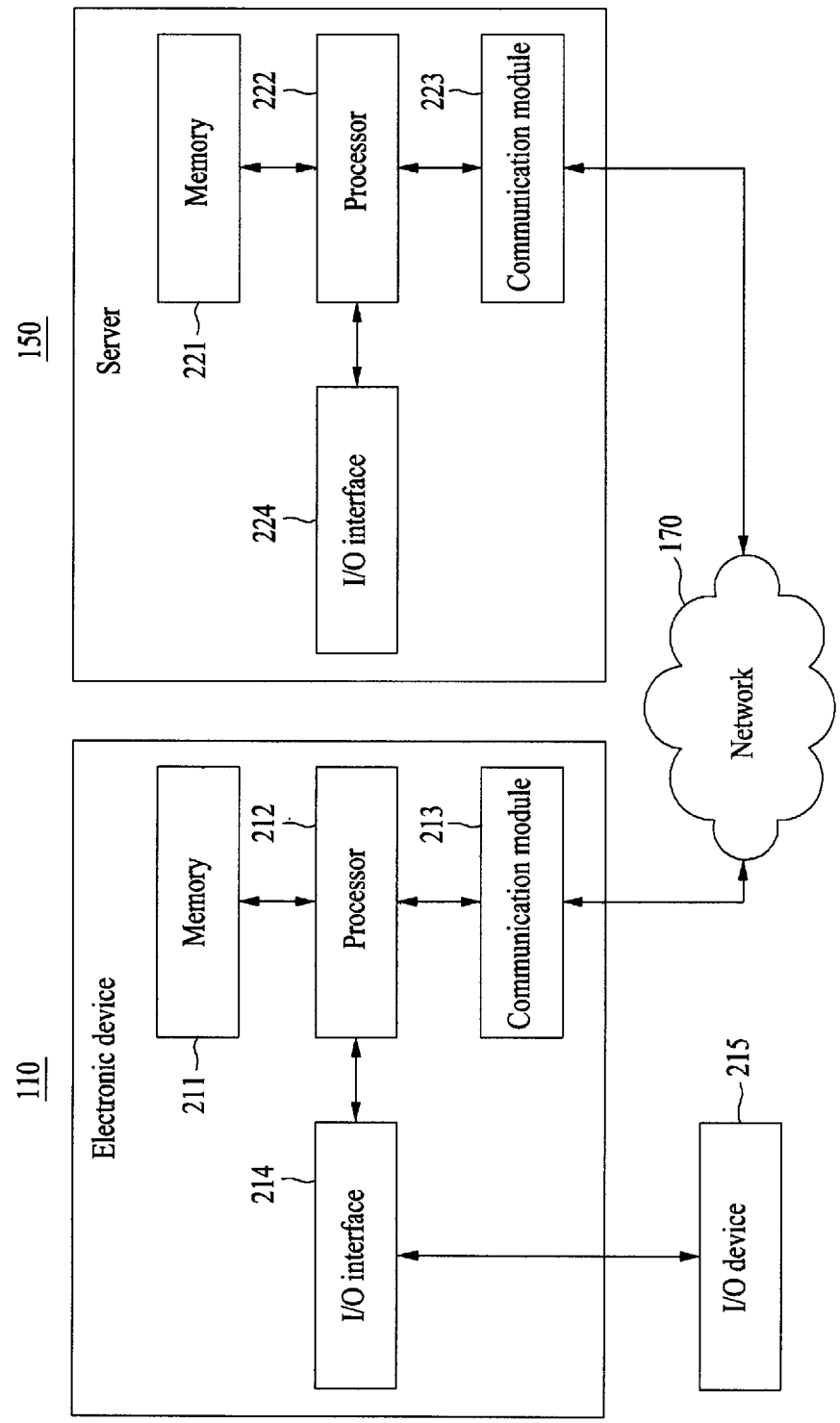
FIG. 2 is a block diagram illustrating a configuration of an electronic device and a server according to one example embodiment.

FIG. 2 is a block diagram illustrating an example of an electronic device and a server according to at least one example embodiment. FIG. 2 illustrates a configuration of the electronic device (1) 110 as an example for a single electronic device and illustrates a configuration of the server 150 as an example for a single server. The same or similar components may be applicable to other electronic devices 120, 130, and 140, or the server 160.

Referring to FIG. 2, the electronic device (1) 110 includes a memory 211, a processor 212, a communication module 213, and an input/output (I/O) interface 214, and the server 150 includes a memory 221, a processor 222, a communication module 223, and an I/O interface 224. Also, an OS or at least one program code, for example, a code for an application installed and executed on the electronic device (1) 110, may be stored in the memory 211, 221. Such software components may be loaded from another non-transitory computer-readable storage medium separate from the memory 211, 221 using a drive mechanism. The other non-transitory computer-readable storage medium may include a non-transitory computer-readable recording medium, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device (1) 110 and the server 150 over the network 170, and may provide a function for communication with another electronic device, for example, the electronic device (2) 120 or another server, for example, the server 160. For example, the processor 212 of the electronic device (1) 110 may transfer a request, for example, a search request, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device (1) 110 through the communication module 213 of the electronic device (1) 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device (1) 110.

The I/O interface 214 may be a device used for interface with an I/O device 215. For example, an input device may include a device, such as a keyboard and a mouse, and an output device may include a device, such as a display for displaying a communication session of an application. As another example, the I/O interface 214 may be a device for interface with an apparatus in which an input function and an output function are integrated into a single function, such as a touchscreen. In detail, when processing instructions of the computer program loaded to the memory 211, the processor 212 of the electronic device (1) 110 may display a service screen configured using data provided from the server 150 or the electronic device (2) 120, or may display content on a display through the I/O interface 214.

According to other example embodiments, the electronic device (1) 110 and the server 150 may include a greater number of components than the number of components shown in FIG. 2. For example, the electronic device (1) 110 may include at least a portion of the I/O device 215, or may further include other components, for example, a transceiver, a global positioning system (GPS) module, a camera, a variety of sensors, a database (DB), and the like. In detail, if the electronic device (1) 110 is a smartphone, the electronic device (1) 110 may be configured to further include a variety of components, for example, an accelerometer sensor, a gyro sensor, a camera, various physical buttons, a button using a touch panel, an I/O port, a vibrator for vibration, etc., which are generally included in a smartphone.

Hereinafter, example embodiments of a method and system for recommending a query using a search context will be described.

The existing query recommendation methods may provide the same recommendation query every time if the same search query is input from all of the users using a service.

According to example embodiments, it is possible to enhance readability and convenience of a search by verifying a query intent of a user or an ambiguity of a search query based on a domain continuity or an object continuity through a search context including a query history of the user for the search query input from the user at an interactive search service and by recommending further various queries.

Figure 3:
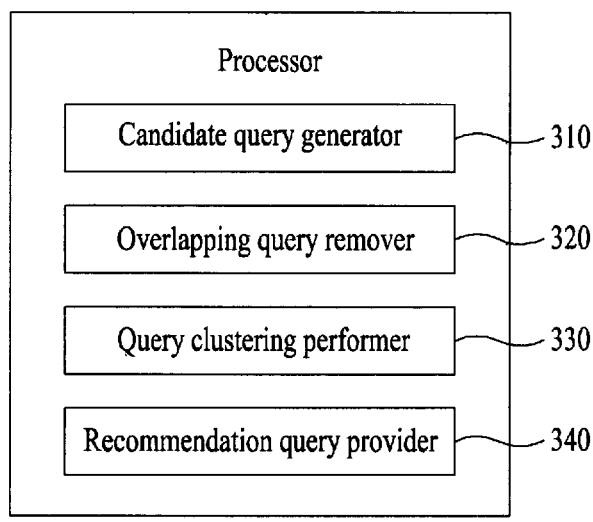
FIG. 3 is a block diagram illustrating an example of components includable in a processor of a server according to one example embodiment.
Figure 4:
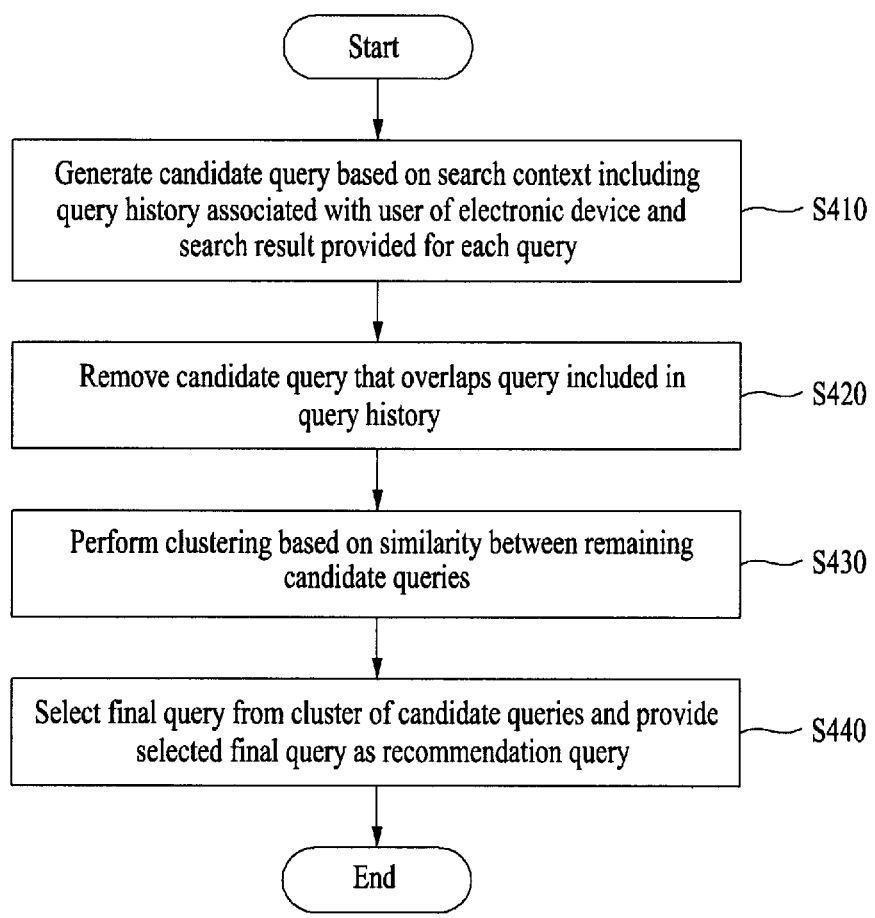
FIG. 4 is a flowchart illustrating an example of a method performed by a server according to one example embodiment.

FIG. 3 is a block diagram illustrating an example of components includable in a processor of a server according to at least one example embodiment, and FIG. 4 is a flowchart illustrating an example of a method performed by a server according to at least one example embodiment.

Referring to FIG. 3, the processor 222 of the server 150 includes a candidate query generator 310, an overlapping query remover 320, a query clustering performer 330, and a recommendation query provider 340 as components. The processor 222 and the components of the processor 222 may control the server 150 to perform operations S410 to S440 included in the method of FIG. 4. Here, the processor 222 and the components of the processor 222 may be configured to execute instructions according to a code of at least one program and a code of an OS included in the memory 221. Also, the components of the processor 222 may be representations of different functions performed by the processor 222 in response to a control instruction provided from at least one program or the OS. For example, the recommendation query provider 340 may be used by the processor 222 as a functional representation for providing a recommendation query in response to the control instruction.

Referring to FIG. 4, in operation S410, the candidate query generator 310 may generate a candidate query for recommending a query to attract an interest of a user of the electronic device (1) 110, based on a search context including a query history associated with the user transmitted and received through a conversation session established between the user of the electronic device (1) 110 and the server 150 for a keyword search and a search result provided for each query. For example, the electronic device (1) 110 may receive a search query from the user through voice recognition or text input method and may transmit the search query input from the user to the server 150 over the network 170. In response thereto, the server 150 may generate a search result corresponding to the search query and may transmit the search result to the electronic device (1) 110 over the network 170. All the data transmitted and received between the user of the electronic device (1) 110 and the server 150, for example, the search query input from the user and the search result provided for each search query, may be stored in a storage space, for example, the memory 211 of the electronic device (1) 110 and/or the memory 221 of the server 150 shown in FIG. 2, as an instance message of an interactive search interface (hereinafter, referred to as a search chatroom) corresponding to the conversation session. The server 150 may provide a recommendation query to assist a search during a process of providing the search result corresponding to the search query. Here, the candidate query generator 310 may generate a candidate query subsequently searchable by the user based on the search context including the query history of the user and the search result for each query.

The search context used for an interactive search service may include 1) the search query input from the user of the electronic device 1(1) 110 and 2) the search result, for example, a text, an image, and a target ID, provided to the user of the electronic device (1) 110, and may additionally include 3) location information of the electronic device (1) 110 and 4) time information of the electronic device (1) 110. The search context may include a query history used for a search and a search result provided for each query, such as, for example, content of providing information on 'tomorrow's weather' in response to 'tomorrow' input after a query 'today's weather', content of providing information on 'movie ironman' in which Robert Downy Junior appears in response to 'ironman' input after a query 'robert downy junior', content of providing information on 'drama ironman' in which Dongwook LEE appears in response to 'ironman' input after a query 'dongwook lee', content of providing information on 'sunghoon kim' in response to a query 'director of tunnel', content of providing information on 'works of sunghoon kim' who is the director of the movie 'tunnel' in response to a query 'find his works' input after the query 'director of tunnel', content of providing information on local 'weather' corresponding to a current location of the user in response to a query 'weather', and content of providing information on a 'real-time traffic situation' corresponding to a current time in response to a query 'traffic situation'.

In addition to the aforementioned information 1) to 4), the search context may further include search histories, for example, queries and search result for each query, of other users using the search service and various types of knowledge graph-based relation information, for example, query to query correlation information such as a related keyword, road related information such as highway GPS information, used for a search, as external information provided from the server 150.

The server 150 may generate a candidate query through a plurality of recommendation logics based on the search context. To this end, the candidate query generator 310 may include an ambiguous query recommendation logic, an attribute type query recommendation logic, a related query recommendation logic, and a hot topic query recommendation logic.

Figure 5:
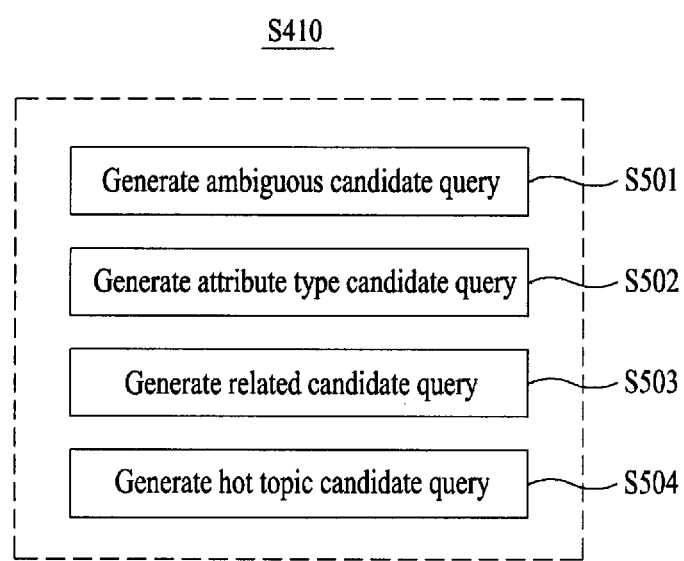

Referring to FIG. 5, in operation S501, the ambiguous query recommendation logic or function of the candidate query generator 310 may analyze an ambiguity of a current search query input from the user based on a query history of the user of the electronic device (1) 110 and a search result provided for each query, and may generate a candidate recommendation query (hereinafter, referred to as an ambiguous candidate query) based on the analyzed ambiguity of the current search query. The server 150 may verify the ambiguity of the current search query based on a previous search query of the user and may provide a search result corresponding thereto. Here, the candidate query generator 310 may generate another target of the search excluding a target provided as the search result, as the ambiguous candidate query. That is, if the current search query input from the user is ambiguous, the candidate query generator 310 may recommend another target excluding the target provided as the search result of the corresponding query.

In operation S502, the attribute type query recommendation logic or function of the candidate query generator 310 may generate a candidate recommendation query (hereinafter, referred to as an attribute type candidate query) for the search query based on attribute information of a subject corresponding to the search query of the user. The server 150 may include a keyword database, such as the memory 211 or 221 shown in FIG. 2, that stores and maintains a pre-registered keyword. Here, the keyword database may include, for each keyword, a subject (domain) to which each keyword belongs and attribute information associated with a corresponding keyword. The subject may indicate a collection for information classification, such as, for example, drama, movie, and song, and the attribute information may include a type or a characteristic of information associated with each subject. The candidate query generator 310 may generate an attribute type candidate query from attribute information of a keyword corresponding to the search query of the user, based on attribute information for each keyword that is stored in the keyword database of the server 150. That is, if the target retrieved by the user has an attribute, the candidate query generator 310 may generate attributes of the retrieved target as the attribute type candidate query. For example, if the user conducts a search on a drama, the candidate query generator 310 may generate attributes associated with the drama as the attribute type candidate query. Also, if the user conducts a search on personnel, the candidate query generator 310 may generate attributes associated with the personnel as the attribute type candidate query.

In operation S503, the related query recommendation logic or function of the candidate query generator 310 may generate a related keyword directly/indirectly associated with the search query of the user as a candidate recommendation query (hereinafter, referred as a related candidate query). The related candidate query denotes a related keyword for the search query of the user, and the related keyword refers to a word having a semantic relationship or a statistical relationship and may be extracted by analyzing various keywords and contents.

In operation S504, the hot topic query recommendation logic or function of the candidate query generator 310 may generate a candidate recommendation query (hereinafter, referred to as a hot issue candidate query) having a temporal issue for the search query of the user. The hot issue candidate query may include a hot topic keyword generated by aggregating a keyword most frequently used in documents generated in news, cafe, blogs, etc., and a real-time sudden rising keyword or a popular keyword that is determined based on a keyword currently most frequently used for a search by users using the search service. That is, the candidate query generator 310 may generate the hot issue candidate query using queries in which users using the search service are currently interested in association with the search query of the user.

FIG. 6 illustrates an example of a candidate query generated through the plurality of recommendation logics according to at least one example embodiment. Initially, a case in which an ambiguous search query 'jinyi hwang' is input from a user and information on 'drama jinyi hwang' is provided as a search result in response thereto will be described.

An ambiguous candidate query 601 relates to recommending information on other targets excluding 'drama jinyi hwang' provided as the search result, and may include 'movie jinyi hwang', 'famous hostess of Chosen dynasty, jinyi hwang', 'music jinyi hwang', and 'book jinyi hwang'.

An attribute type candidate query 602 relates to recommending attribute information of 'drama jinyi hwang' provided as the search result, and may include attributes of the drama, such as for example, 'cast', 'production staff', 'story', and 'episode information'.

A related candidate query 603 relates to recommending targets directly/indirectly associated with the search query 'jinyi hwang' input from the user, and may include a related keyword having a semantic relationship or a statistical relationship with 'jinyi hwang', such as for example, 'jinyi hwang OST', 'jinyi hwang poem', 'jinyi hwang movie', 'jinyi hwang lyrics', and 'jinyi hwang viewer ratings'.

A hot topic candidate query 604 relates to recommending queries in which users are currently interested in association with 'drama jinyi hwang' provided as the search result, and may include a hot topic keyword, for example, 'jiwon ha's recent condition', 'jiwon ha marriage', etc., associated with 'jiwon ha' if the personnel 'jiwon ha' appearing in 'drama jinyi hwang' is currently issued.

Accordingly, the candidate query generator 310 may generate a candidate query, for example, an ambiguous candidate query, an attribute type candidate query, a related candidate query, and a hot topic candidate query, through the plurality of recommendation logics as a query to be recommended to the user based on a search context that exchanged with the user at an interactive search service.

Referring again to FIG. 4, in operation S420, the overlapping query remover 320 may remove a candidate query that overlaps a previous query from among candidate queries generated in operation S410 based on the query history of the user. The query history may include at least one of a recommending query history provided to the user and a search query history directly input from the user. For example, the overlapping query remover 320 may select a query that is previously used by the user for a search and may remove, from queries included in the query history, the same candidate query as the selected query. As another example, the overlapping query remover 320 may select a query having a history used for a search at a desired ratio or less compared to a number of recommendations, that is, a query having a relatively low probability to be used by the user for the search from among recommendation queries provided to the user, and may remove the same candidate query as the selected query. That is, the overlapping query remover 320 may verify whether a candidate query and a previous query overlap using the query history and may remove some candidate queries that overlap the previous query.

In operation S430, the query clustering performer 330 may perform clustering based on a similarity between remaining candidate queries in which a portion of candidate queries are removed from among the candidate queries generated in operation S410. The candidate query clustering is to recommend a semantically different query excluding the same or similar query to the user. An example of a clustering algorithm may use a K-mean clustering algorithm that divides a number of candidate queries by K clusters. The number, K, of clusters may be variably determined based on a level of ambiguity (e.g., a number of meanings of a corresponding query or a number of subjects into which a target retrieved in response to the corresponding query is classified) of the retrieved target and a number of candidate queries generated from each recommendation logic. The number of clusters may be changed by measuring a similarity between different clusters per iteration and by calculating the entire loss based on the measured similarity.

In operation S440, the recommendation query provider 340 may select a final query from the cluster of candidate queries and may provide the selected final query to the electronic device (1) 110 as a recommendation query. For example, the recommendation query provider 340 may select at least one representative query from each cluster and may generate the representative query for each cluster as the recommendation query. The representative query may be any random query selected from the candidate query cluster or based on the ranking or order of the queries in the cluster according to, for example, on popularity or other ordering schemes. The recommendation query provider 340 may generate a list in which a desired number of representative queries of clusters are alternately sorted in predetermined order, for example, based on vocabulary, popularity, etc., or in random order and may provide the generated list to the electronic device (1) 110. The electronic device (1) 110 may display the search query input from the user and the search result provided from the server 150 in response to the corresponding search query on the screen of the electronic device (1) 110 in a form of conversation messages exchanged with the user through the search chatroom. Here, the electronic device (1) 110 may display the recommendation query to be provided from the server 150 to the user with the search query or the search result displayed on the screen of the electronic device (1) 110.

FIGS. 7 to 10 illustrate examples of displaying a search result and a recommendation query provided from a server on a screen of the electronic device (1) 110 according to at least one example embodiment.

Figure 7:
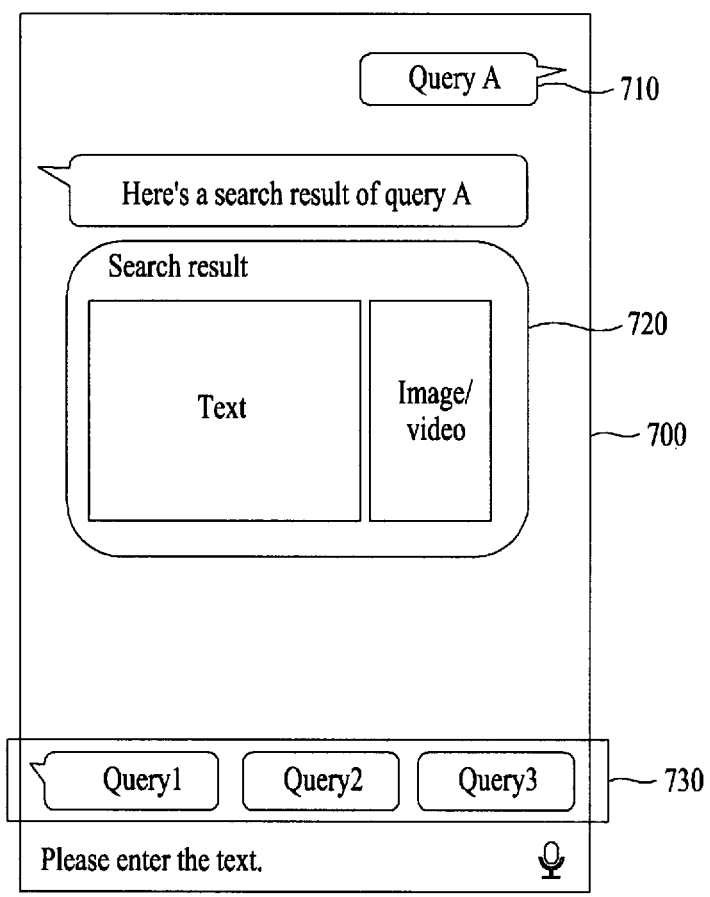
FIGS. 7 to 10 illustrate examples of displaying a search result and a recommendation query provided from a server on a screen of an electronic device according to at least one example embodiment.

Referring to FIG. 7, a search query 710 input from the user using voice or a text and a search result 720 generated by the server 150 in response to the search query 710 may be displayed in a form of a conversation message on a search chatroom 700.

When the search result 720 is displayed on the search chatroom 700, recommendation queries 730 generated by the server 150 may be displayed on a partial area of the search chatroom 700, for example, at a location adjacent to a query input box or at a lower end of the search chatroom 700.

When a single search result 720 is generated by the server 150 in response to 'query A', a single card may be generated as a display entity for displaying the search result 720 on the search chatroom 700 and the search result 720 may be displayed on the corresponding card as shown in FIG. 7.

Figure 8:
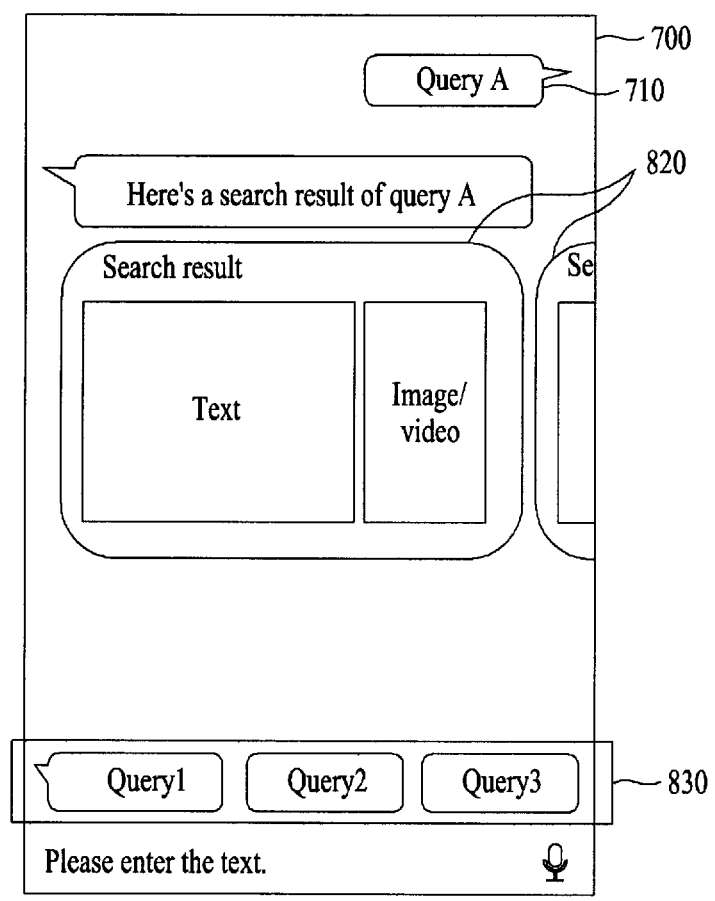

Referring to FIG. 8, when a plurality of search results 820 are generated by the server 150 in response to 'query A', a number of cards corresponding to a number of search results 820 may be generated in a carousel form on the search chatroom 700 and the search results 820 may be displayed on the cards, respectively. For example, the number of search results 820 may be selectively displayed one by one while the number of cards generated in the carousel form move on the search chatroom 700 in response to a flicking gesture of the user.

When the plurality of search results 820 are present in response to 'query A', the server 150 may generate recommendation queries 830 for each of the search results 820. The recommendation queries 830 associated with each of the search results 820 may be actually displayed on the screen of the electronic device (1) 110.

Here, it is assumed that two search results, for example, search result I and search result II, are generated in response to 'query A' and query 1, query 2, and query 3 are generated as recommendation queries for the search result I and query 11, query 12, and query 13 are generated as recommendation queries for the search result II.

When the search result I is displayed on the screen of the electronic device (1) 110 among the search results associated with 'query A', the recommendation queries, that is, query 1, query 2, and query 3, generated for the search result I are displayed. If the search result II is displayed on the screen of the electronic device (1) 110, the recommendation queries, that is, query 11, query 12, and query 13, generated for the search result II are displayed. If a plurality of search results are provided in response to 'query A', the plurality of search results may be selectively displayed one by one through card flicking and a query corresponding to a corresponding search result may be recommended as a recommendation query depending on a search result that is displayed on the screen of the electronic device (1) 110. That is, a different recommendation query may be provided for each search result based on a target that is provided as the search result. For example, a recommendation query for the search result I and a recommendation query for the search result II may differ from each other.

In response to an input of a new search query, a previous search query and a previous search result may move in one direction, for example, an upward direction and the input new search query and a new search result corresponding thereto may be inserted into a search chatroom and displayed on the screen of the electronic device (1) 110. Here, a recommendation query for the previous search result deviated from the screen of the electronic device (1) 110 may disappear therefrom and a recommendation query for the new search result that is currently displayed on the screen of the electronic device (1) 110 may be displayed thereon.

Figure 9:
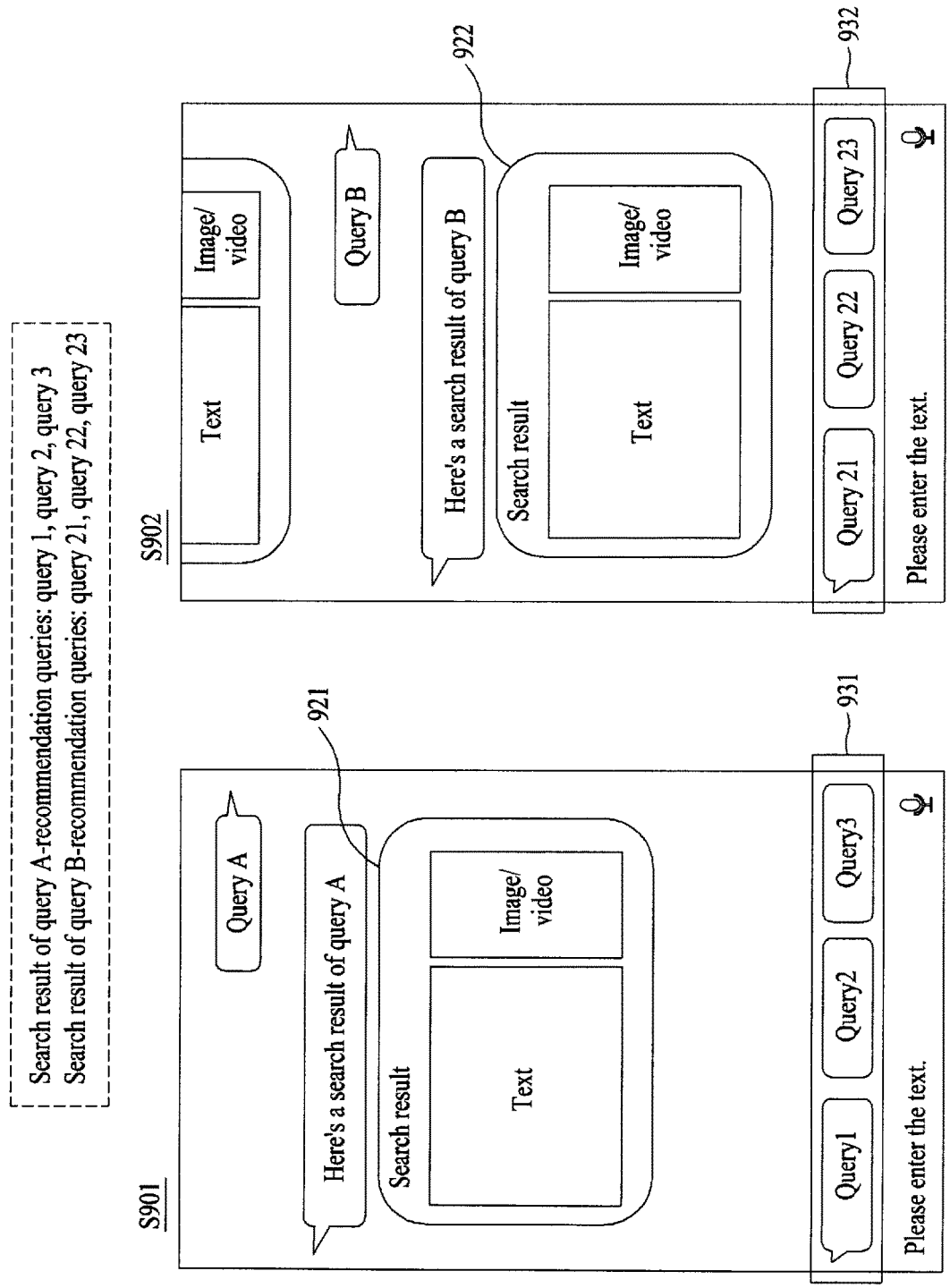

Referring to FIG. 9, it is assumed that query 1, query 2, and query 3 are generated as recommendation queries for a search result of 'query A' and query 21, query 22, and query 23 are generated as recommendation queries for a search result of 'query B'.

When a search result 921 for 'query A' is displayed on the screen of the electronic device (1) 110, query 1, query 2, and query 3 may be displayed as recommendation queries 931 associated with the search result 921 (S901). When, in response to an input of a new search query 'query B', 'query B' and a search result 922 for 'query B' are displayed on the screen of the electronic device (1) 110, the recommendation queries may be replaced with query 21, query 22, and query 23 that are recommendation queries 932 associated with the search result 922 and the replaced recommendation queries 932 may be displayed (S902).

Here, the server 150 may verify an ambiguity of 'query B' based on 'query A' and the search result 921 of 'query A' and may generate the search result 922 of 'query B' based on the verified ambiguity.

The electronic device (1) 110 may display a previous search result and a recommendation query while moving a search chatroom displayed on the screen of the electronic device (1) 110 in response to a scroll gesture of the user.

In a state in which the search result 922 for 'query B' and the recommendation queries 932, that is, query 21, query 22, and query 23, are displayed on the screen of the electronic device (1) 110, the user may scroll up the search chatroom and in response thereto, the search result 921 for 'query A' may be displayed again on the screen of the electronic device (1) 110. In this case, the recommendation queries may be replaced with the recommendation queries 931, that is, query 1, query 2, and query 3, generated for the search result 921 of 'query A'.

The recommendation queries 931 of the previous search result 921 may be updated and displayed based on a point in time at which the current search result 922 is displayed and then the previous search result 921 is displayed again on the screen of the electronic device (1) 110. For example, if the search result 921 is displayed again after a predetermined period of time is elapsed after an initial point in time at which the search result 921 is displayed, a recommendation query for the search result 921 may be requested again and the recommendation queries 931 newly generated at a corresponding point in time may be displayed on the screen of the electronic device (1) 110. For example, the recommendation queries 931 including query 1, query 2, and query 3 may be displayed at the initial point in time at which the search result 921 is displayed. If a predetermined period of time is elapsed, the search result 921 may be displayed again and the recommendation queries 931 updated with query 1, query 2, and query 3 may be displayed.

The server 150 may provide a recommendation query based on a search query input from the user and a search result generated for the search query, and may provide, as the recommendation query, for example, a query for recommending another target excluding a retrieved target, a query for recommending attributes of the retrieved target, a query for recommending a target directly/indirectly associated with the retrieved target, and a query for recommending a hot topic target associated with the retrieved target.

Figure 10:
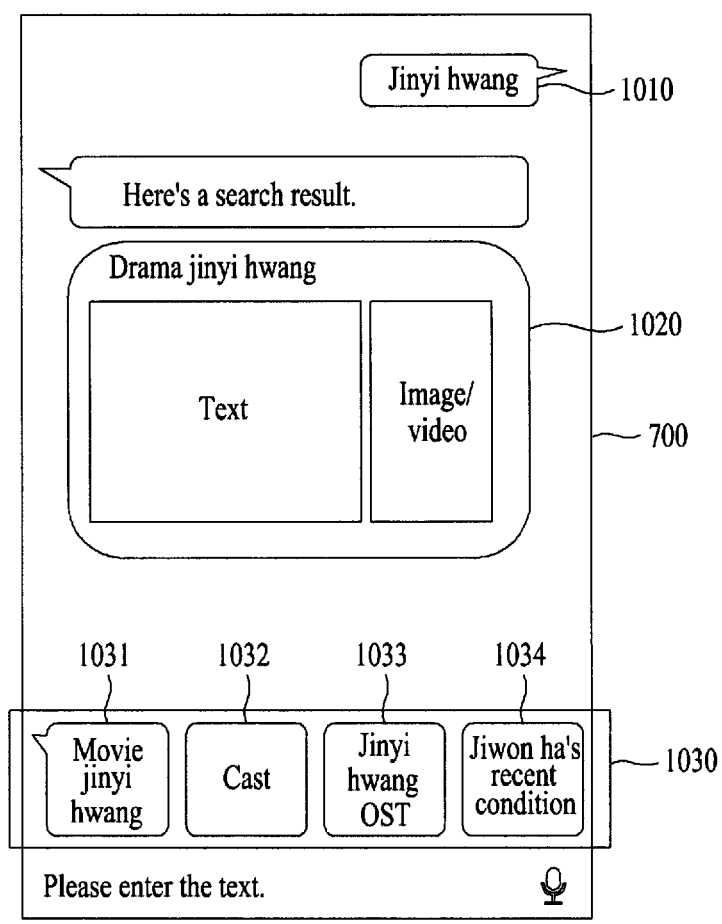

For example, referring to FIG. 10, when the user inputs 'jinyi hwang' as a search query 1010 in the search chatroom 700 and information on 'drama jinyi hwang' is provided as a search result 1020 for the search query 1010, recommendation queries 1030 generated based on the search query 1010 and the search result 1020 may be displayed on the search chatroom 700. The recommendation queries 1030 may include 'movie jinyi hwang' as an example of an ambiguous query 1031 that is a query for recommending another target excluding the retrieved target 'drama jinyi hwang', 'cast' as an example of an attribute type query 1032 that is a query for recommending attributes of the retrieved target 'drama jinyi hwang', 'jinyi hwang OST' as an example of a related query 1033 that is a query for recommending a target directly/indirectly associated with the retrieved target 'drama jinyi hwang', and 'jinwon ha's recent condition' as an example of a hot topic query 1034 that is a query for recommending a corresponding hot topic target if the recent condition of the personnel 'jiwon ha' associated with the retrieved target 'drama jinyi hwang' is currently issued.

The electronic device (1) 110 may generate recommendation queries provided from the server 150 in a list of cards in a carousel form, and may selectively display at least a portion of recommendation queries included in the list in response to a flicking gesture of the user. As another example, the electronic device (1) 110 may provide a separate user interface for a recommendation query and collectively display the entire queries included in the list in response to a selection on the user interface.

According to some example embodiments, it is possible to verify a search context of a user from a query history associated with the user and a search result for each query at a search service and to recommend queries in which the user may be interested.

According to some example embodiments, it is possible to provide a recommendation query based on a result of verifying a search context including a query history of a user in response to a search query input from the user. Also, according to some example embodiments, it is possible to verify a query history input from a user using an interactive search service and to provide a recommendation query to which a query intent of the user is applied. Also, according to some example embodiments, it is possible to verify an ambiguity of a current input search query based on a query history input from the user and a search result for each query and to recommend a query having a meaning different from a corresponding query.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A recommendation query providing method of a server implemented as a computer, the recommendation query providing method comprising:
generating candidate queries to be recommended to a user based on a search context including a query history associated with the user and a search result provided for each search query input from the user;
removing, from among the candidate queries, a candidate query that overlaps a search query included in the query history, so that the search query included in the query history is not included in the candidate queries;
performing clustering of the candidate queries remaining after the overlapping candidate query has been removed based on a similarity between the candidate queries;
providing an electronic device of the user with a final candidate query selected from each cluster of candidate queries as a recommendation query.

2. The recommendation query providing method of claim 1, wherein the generating of the candidate queries comprises analyzing an ambiguity of the search query input from the user using the query history and the search result for each search query, and generating the candidate queries based on the ambiguity of the search query.

3. The recommendation query providing method of claim 1, wherein the generating of the candidate queries comprises generating an ambiguous candidate query for recommending other targets different from a target retrieved as the search result based on an ambiguity of the search query input from the user.

4. The recommendation query providing method of claim 3, wherein the generating of the candidate queries further comprises generating at least one of an attribute type candidate query for recommending attributes corresponding to the target retrieved as the search result, a related candidate query for recommending a related keyword associated with the search query, and a hot topic candidate query for recommending a hot topic target associated with the target retrieved as the search result.

5. The recommendation query providing method of claim 1, wherein the candidate queries are generated using at least two recommendation logics among an ambiguous query recommendation logic for recommending other targets different from a target retrieved as the search result based on an ambiguity of the search query input from the user, an attribute type query recommendation logic for recommending attributes corresponding to the target retrieved as the search result, a related query recommendation logic for recommending a related keyword associated with the search query, and a hot topic query recommendation logic for recommending a hot topic target associated with the target retrieved as the search result.

6. The recommendation query providing method of claim 1, wherein the overlapping candidate query is removed using at least one of a query history recommended to the user and a search query history directly input from the user.

7. The recommendation query providing method of claim 1, wherein the removed overlapping candidate query includes a search query previously used by the user for a search using the query history.

8. The recommendation query providing method of claim 1, wherein the removing of the overlapping candidate query comprises selecting a search query having a query history used for a search at a desired ratio or less compared to a number of recommendations from among search queries recommended to the user using the query history, and removing a candidate query that overlaps the selected query.

9. The recommendation query providing method of claim 1, wherein the clustering of the candidate queries comprises determining a desired number of clusters based on a level of ambiguity of a target retrieved in response to the search query input from the user and a number of the candidate queries, and performing the clustering of the candidate queries based on the similarity between the candidate queries and the desired number of clusters.

10. The recommendation query providing method of claim 1, wherein the candidate queries are clustered using a K-mean algorithm that performs a division by K clusters based on the similarity between the candidate queries.

11. A non-transitory computer-readable medium storing a program to implement the method according to one of claims 6, 8, 9, and 10.

12. A recommendation query providing system of a server implemented as a computer, the recommendation query providing system comprising:
　at least one processor configured to execute computer-readable instructions,
　wherein the at least one processor comprises:
　a candidate query generator configured to generate candidate queries to be recommended to a user based on a search context including a query history associated with the user and a search result provided for each search query input from the user;
　an overlapping query remover configured to remove from among the candidate queries, a candidate query that overlaps search query included in the query history, so that the search query included in the query history is not included in the candidate queries;
　a query clustering performer configured to perform clustering of the candidate queries remaining after the overlapping candidate query has been removed based on a similarity between the candidate queries;
　a recommendation query provider configured to provide an electronic device of the user with a final candidate query selected from each cluster of candidate queries as a recommendation query.

13. The recommendation query providing system of claim 12, wherein the candidate query generator is configured to generate an ambiguous candidate query for recommending other targets different from a target retrieved as the search result based on an ambiguity of the search query input from the user.

14. The recommendation query providing system of claim 12, wherein the candidate query generator comprises at least two recommendation functions among an ambiguous query recommendation function for recommending other targets different from a target retrieved as the search result based on an ambiguity of the search query input from the user, an attribute type query recommendation function for recommending attributes corresponding to the target retrieved as the search result, a related query recommendation function for recommending a related keyword associated with the search query, and a hot topic query recommendation function for recommending a hot topic target associated with the target retrieved as the search result.

15. The recommendation query providing system of claim 12, wherein the overlapping query remover is configured to remove, from among the candidate queries, a search query previously used by the user for a search using the query history.

16. The recommendation query providing system of claim 12, wherein the overlapping query remover is configured to select a search query having a query history used for a search at a desired ratio or less compared to a number of recommendations from among search queries recommended to the user using the query history, and to remove a candidate query that overlaps the selected query.

17. The recommendation query providing system of claim 12, wherein the query clustering performer is configured to determine a desired number of clusters based on a level of ambiguity of a target retrieved in response to the search query input from the user and a number of the candidate queries, and to perform clustering of the candidate queries based on the similarity between the candidate queries and the desired number of clusters.

18. The recommendation query providing system of claim 12, wherein the candidate queries are clustered using a K-mean algorithm that performs a division by K clusters based on the similarity between the candidate queries.

* * * * *